United States Patent [19]

McCaffrey et al.

[11] Patent Number: 4,540,511

[45] Date of Patent: Sep. 10, 1985

[54] DEFOAMER AND PROCESSING AID FOR WET PROCESS PHOSPHORIC ACID

[75] Inventors: Eugene F. McCaffrey; Alfred J. Dieterman, both of Mississauga; Luba Knazko, Palgrave, all of Canada

[73] Assignee: National Distillers and Chemical Corporation, New York, N.Y.

[21] Appl. No.: 580,395

[22] Filed: Feb. 15, 1984

[51] Int. Cl.$^3$ .............................................. B01D 19/04
[52] U.S. Cl. ..................... 252/321; 252/358; 423/320
[58] Field of Search ................................ 252/321, 358

[56] References Cited

U.S. PATENT DOCUMENTS

| | | | |
|---|---|---|---|
| 2,085,709 | 6/1937 | Steibelt | 252/321 |
| 3,653,827 | 4/1972 | Hey et al. | 252/321 X |
| 3,671,235 | 6/1972 | Yamaguchi et al. | 252/358 X |
| 3,761,423 | 9/1973 | Hey et al. | 252/321 X |
| 4,065,402 | 12/1977 | Satterwhite et al. | 252/321 X |
| 4,065,404 | 12/1977 | Satterwhite et al. | 252/321 X |
| 4,145,310 | 3/1979 | Satterwhite et al. | 252/358 |

*Primary Examiner*—Richard D. Lovering
*Attorney, Agent, or Firm*—Kenneth D. Tremain; Gerald A. Baracka

[57] ABSTRACT

A defoamer composition comprising a mixture of defoaming effective amounts of monocarboxylic acid having from 12 to 26 carbon atoms, a monoalkanolamide, and an alcohol selected from the group consisting of primary linear aliphatic alcohols ranging from $C_4$ to $C_{20}$, primary branch aliphatic alcohols ranging from $C_4$ to $C_{20}$, and secondary alcohols ranging from $C_6$ to $C_{12}$; and a method of inhibiting foaming in a phosphate rock and sulfuric acid medium employed in the synthesis of phosphoric acid by the "wet process" manufacture of phosphoric acid which comprises adding to the reaction medium an effective amount of the above described defoamer composition.

13 Claims, No Drawings

DEFOAMER AND PROCESSING AID FOR WET PROCESS PHOSPHORIC ACID

FIELD OF THE INVENTION

This invention relates to an improved defoamer composition and a method of its use during synthesis of phosphoric acid. More particularly, this invention relates to a defoamer composition comprising a mixture of monocarboxylic acids, a monoalkanolamide, and an alcohol which in effective amounts inhibits foaming in a phosphate rock sulfuric acid medium employed in the synthesis of phosphoric acid.

BACKGROUND OF THE INVENTION

Phosphoric acid may be synthesized by the so called "wet process" technique wherein phosphate rock, for example, apatite, is reacted with sulfuric acid, of known concentrations, at elevated temperatures, generally above 70° C. Existing "wet process" methods differ somewhat but have a common objective of producing a satisfactory phosphoric acid product yield together with a calcium sulphate crystal by-product and practically and efficiently separating the two compositions.

The reactions involved in the "wet process" synthesis of phosphoric acid evolve large volumes of carbon dioxide, and some hydrogen fluoride gas which result in the development of substantial amounts of foam. The foam produced hinders the reaction process by reducing the capacity of the equipment used in the various process steps and may result in overflows of foam which can create dangerous conditions for plant personnel because of the well-known caustic properties of phosphoric acid.

Various anti-foam agents have been used to control foaming in such processes, including tall oil fatty acids, oleic acids, sulfonated tall oil fatty or oleic acids, and silicones.

U.S. Pat. No. 3,437,437 to Dorwart discloses the use of the reaction product of hydroxylamine and a fatty acid to control foaming during the production of wet process phosphoric acid.

Canadian Pat. No. 803,928 also to Dorwart discloses that the effectiveness of the product of a hydroxylamine and a fatty acid can have increased anti-foam effectiveness by adding a surfactant to the mixture. An example of the surfactant used as an additive is 10% by weight of an alkyl aryl polyether alcohol based surfactant such as Triton X-100 which is commercially available from the Rohm & Haas Company. The use of the surfactant additive apparently acts to decrease the quantity of anti-foam ester which is required to control predetermined amounts of foam during processing of phosphate rock.

U.S. Pat. Nos. 4,065,402; 4,065,404; and 4,145,310 all to Satterwhite, et al. are directed to defoamers for high strength acid media. These patents disclose a defoamer for controlling foam in high strength acid media including wet process phosphoric acid manufacture media. The defoamers of these patents consist of sulfonated fatty acids such as tall oils combined with long chain alcohols such as dodecyl alcohol. Additionally, the U.S. Pat. No. 4,065,404 discloses the use of a non-ionic additive to the fatty acid long chain alcohol mixture. These non-ionic additives are preferably selected from the group consisting of tridecyloxypoly(ethyleneoxy ethanol and octylphenoxy (ethyleneoxy)ethanol.

U.S. Pat. No. 4,083,936 to Woodward discloses the use of phosphate esters of aliphatic alcohols as antifoaming compositions in wet process manufacture of phosphoric acid to control the foam produced during phosphoric acid manufacture.

U.S. Pat. Nos. 3,653,827 and 3,761,423 to Hey, et al. the entire disclosures of which are incorporated herein by reference disclose the use of a defoaming agent which comprises a mixture of (1) a monoalkanolamide of a monoalkanolamine and a monocarboxylic acid having from 12 to 22 carbon atoms and a melting point below about 20° C. and (2) a fatty acid which is a monocarboxylic acid having from 12 to 22 carbon atoms and a melting point below about 20° C., in specifically defined proportions to increase the yield of phosphoric acid in the "wet process" synthesis and to inhibit the production of foam during such processes.

While the above-noted defoamers are apparently effective as defoamers during "wet process" manufacture of phosphoric acid, it has become apparent that the normal phosphate rock used in the phosphoric acid industry in the last few years is of a lesser quality than has been used before. The poorer quality phosphate rock causes an increase in the formation of foam during the wet process manufacture of phosphoric acid. To meet the increased foam problem an improved defoaming agent is required.

SUMMARY OF THE INVENTION

It is therefore an object of the present invention to provide an improved defoamer composition which is effective to control foaming during wet process production of phosphoric acid. It is a further object of the invention to provide a defoamer composition which is effective to control defoaming during wet process production of phosphoric acid when poorer quality phosphate rock is used as source material.

It is an additional object of the invention to provide a method of inhibiting foaming in a phosphate rock and sulfuric acid medium employed in the synthesis of phosphoric acid by the wet process method which is effective even when poorer quality phosphate rock is utilized in the process.

Additional objects and advantages of the invention will be set forth, in part, in the description which follows and in part will be obvious from the description, or may be learned by practice of the invention. The objects and advantages of the invention are realized and obtained by means of the compounds, methods, processes and the combinations particularly pointed out in the appended claims.

To achieve the objects in accordance with the purposes of the invention, as embodied and broadly described herein, the invention comprises a defoamer composition comprising a mixture of defoaming effective amounts of (a) a monocarboxylic acid having from 12 to 26 carbon atoms and a melting point below about 20° C.; (b) a monoalkanolamide, derived from a monocarboxylic acid having from 12 to 26 carbon atoms and a melting point below about 20° C. and a monoalkanolamine; and an alcohol selected from the group consisting of primary linear aliphatic alcohols ranging from $C_4$ to $C_{20}$, primary branched aliphatic alcohols ranging from $C_4$ to $C_{20}$, and secondary alcohols ranging from $C_6$ to $C_{12}$.

As embodied and broadly described herein, the invention also comprises a method of inhibiting foaming caused by processing phosphate rock in a sulfuric acid medium during the synthesis of phosphoric acid which comprises adding to the reaction medium an effective amount of a defoaming composition comprising a mixture of (a) a monocarboxylic acid having from 12 to 26 carbon atoms and a melting point below about 20° C.; (b) a monoalkanolamide, wherein the monoalkanolamide is derived from a monocarboxylic acid having from 12 to 26 carbon atoms a melting point below about 20° C. and a monoalkanolamine; and (c) an alcohol selected from the group consisting of primary linear aliphatic alcohols ranging from $C_4$ to $C_{20}$, primary branched aliphatic alcohols ranging from $C_4$ to $C_{20}$, and secondary alcohols ranging from $C_6$ to $C_{12}$.

It is to be understood that both the foregoing general and following detailed description are exemplary and explanatory only and are not intended to be restrictive of the invention as claimed.

DETAILED DESCRIPTION OF PREFERRED EMODIMENTS OF THE INVENTION

Reference will now be made in detail to present preferred embodiments of the invention, examples of which are illustrated in the following example section.

In accordance with the invention, a defoamer composition comprising a mixture of a defoaming amount of (a) a monocarboxylic acid having from 12 to 26 carbon atoms and a melting point below about 20° C.; (b) a monoalkanolamide, derived from a monocarboxylic acid having from 12 to 26 carbon atoms and amelting point below about 20° C. and a monoalkanolamine; and (c) an alcohol selected from the group consisting of primary linear aliphatic alcohols having from 4 to 20 carbon atoms, primary branched alcohols having from 4 to 20 carbon atoms, and secondary alcohols having from 6 to 12 carbon atoms is prepared.

Preferably, the effective amounts of the various components of the mixture in weight percent are from 50 to 95 weight percent of component (a) the monocarboxylic acid; 5 to 45 weight percent of component (b) the monoalkanolamide; and 0.25 to 20 weight percent of the component (c) the alcohol. More preferably the effective amounts of the various components of the mixture in weight percent are from 65–85 weight percent of component (a) the monocarboxylic acid; 15–23 weight percent of component (b) the monoalkanolamide; and 0.5 to 10 weight percent of component (c) the alcohol.

Unsaturated monocarboxylic acids are preferably employed to obtain the improved defoamer compositions of the present invention. The unsaturated monocarboxylic acids generally contain from about 12 to 26 carbon atoms and include fatty acids, such as myristoleic acid, palmitoleic acid, oleic acid, linoleic acid, linolenic acid, ricinoleic acid, and mixed acids derived from natural sources, e.g., tall oil. Tall oil, and tall oil fatty acids and rosin acids obtained from tall oil are particularly useful sources for the preparation of the defoamer compositions primarily due to their low cost but also because of the good performance of the composition derived therefrom when applied in the phosphoric acid manufacture process. Rosin acid predominantly comprises abietic acid, dehydroabietic acid, neoabietic acid, palustric acid, pimaric acid and iso-pimaric acid. Whereas acids obtained from tall oil are predominantly unsaturated acids, small amounts of saturated fatty acid are also present and are not detrimental to the defoamer formulation, provided that they do not exceed 10 percent of the fatty acid composition.

The monoalkanolamine of the invention is preferably selected from the group consisting of monoethanolamine, iso-propanolamine, n-propanolamine and N-(aminoethyl) ethanolamine. The amide of the invention is produced from the reaction of a monoalkanolamine and a monocarboxylic acid or a mixture of carboxylic acids as described above.

The amine and the fatty acid are reacted in such a way as to effectively inhibit the formation of ester and/or amine-ester products to produce a composition which is essentially a completely amidated product of the alkanolamine and the fatty acid. The reaction may be accomplished by reacting approximately equimolar quantities of the alkanolamine and the acid in a temperature range of about 160° C. to 180° C. until essentially the theoretical amount of water of reaction has been recovered from the reaction system and the acid number is in the range of 1 to 6.0, in the absence of acidic materials that may serve as esterification catalysts. The reaction can be carried out at atmospheric pressures or reduced pressures, whereby reduced pressures can be used to complete the reaction and to remove any residual water of reaction. The amide product can then be admixed with the appropriate amount of fatty acid as described above and further admixed with the alcohol component.

The alcohol component of the invention is preferably a primary linear aliphatic alcohol ranging from $C_4$ to $C_{20}$, a primary branch aliphatic alcohol ranging from $C_4$ to $C_{20}$, or a secondary alcohol ranging from $C_6$ to $C_{12}$. Examples of alcohols used according to the invention are hexyl, tetradecyl, decyl, tridecyl, amyl, octyl, dodecyl, sec-octyl, tert-octyl, arachidyl and 2-ethyl hexyl alcohols, and the like.

In accordance with a further embodiment of the present invention, the above-described defoamer composition is useful in a method of inhibiting foaming in a phosphate rock and sulfuric acid medium employed in the synthesis of phosphoric acid during the so-called "wet process" manufacture of phosphoric acid. In carrying out the method of the invention, the defoaming composition in accordance with this invention and described above is added to the reaction medium in an amount effective to control defoaming.

It has generally been found that an effective amount is from one to about five pounds of the defoamer composition to be added to the reaction medium per ton of $P_2O_5$ in the phosphate rock. The $P_2O_5$ content in the phosphate rock varies as the quality of the phosphate rock varies. Larger amounts, e.g., up to ten pounds or more, of the defoamer composition may be used but such excess amounts are not practical.

An important advantage of the present invention derives from the use of the alcohol additive which has been found to have a synergistic effect when combined with fatty acid and the fatty acid alkanolamide. The addition of alcohol increases the effectiveness of the defoaming composition of the invention. As will be illustrated by the examples of the invention which follow, the addition of small amounts of alcohol have an important and significant effect upon the defoaming capability of the defoamer composition of the invention.

The invention will now be illustrated by examples. The examples are not intended to be limiting of the scope of the present invention. In conjunction with the general and detailed description above, the examples provide further understanding of the present invention and outline the preparation of the defoamer composition of the invention and a method of using the defoamer composition of the invention in wet process phosphoric acid manufacture.

EXAMPLES

The following examples represent preferred embodiments of the defoaming compositions of the invention and methods for carrying out defoaming during wet process phosphoric acid manufacture. The starting materials for the examples whose method of preparation are not indicated, are commercially available compounds which would be available from chemical supply houses well known to the art such as Aldrich Chemical Company.

EXAMPLE 1

A mixture of monocarboxylic acid and monoalkanolamide of the type described in the Hey, et al. U.S. Pat. Nos. 3,761,423 and 3,653,827 was prepared by blending 80 weight percent of a mixed fatty product (titer 20° C.; iodine value 94) containing approximately equal amounts of $C_{12-18}$ branched-chain fatty acids and $C_{14-18}$ straight-chain (normal) fatty acids with 20 weight percent of the monoethanolamide of the mixed fatty acid. The monoethanolamide was obtained by reacting one mole of the mixed fatty acid with one mole monoethanolamine at 160° C. to 180° C. until about one mole of water was collected and the acid value was below 5.

To this mixture was added 1% by total mixture weight of hexanol (hexyl alcohol) with stirring at room temperature.

The defoaming properties of the formulations of the examples were measured by the following test method which has been found to correlate with commercial operations. Eighty-eight grams of recycled phosphoric acid (approximately 25% $P_2O_5$ equivalent content) and a measured amount of defoamer are charged into a one liter graduated cylinder equipped with an 80 RPM stirrer and maintained at a temperature of 70° C. Phosphate rock (64 grams) is added and the slurry is stirred to fully wet the rock. Sulfuric acid (94 grams, 56%) is rapidly introduced with stirring and the total system volume versus time is plotted to determine maximum foam evolution and rate of change of foam volumes. The foam volume is calculated as the total volume less 180 ml (which is the volume of reactants, etc.). The foam volume was tested following five seconds after the addition of the defoaming composition. Control refers to the amount of foam produced when no defoaming agent is used; the designation Comparative A (Comp. A) refers to the use as a defoamer of a mixture of monocarboxylic acid and monoalkanolamide as prepared according to Example 1 except that no alcohol component is present; $C_6$ alcohol refers to the use of hexyl alcohol as the sole additive and the designation New Defoamer refers to the defoaming combination of the mixture of carboxylic acid and monoalkanolamine and the $C_6$ alcohol additive of Example 1.

| Comparative Study of Example 1 | | | |
|---|---|---|---|
| | Control | Comp. A | $C_6$ Alcohol | Hexyl Alcohol New Defoamer |
| Foam Vol., ml | 420 | 120 | 270 | 80 |

EXAMPLES 2-4

Examples 2-4 were carried out in the same manner as Example 1 except that the type of alcohol added to the defoamer mixture was altered for each example as indicated. The following table shows the results obtained for the new defoamer prepared with the various alcohols indicated.

| Comparative Studies of Examples 2-4 | | | | |
|---|---|---|---|---|
| Example 2 | Control | Comp. A | $C_{14}$ Alcohol | Tetradecyl Alcohol New Defoamer |
| Foam Vol., ml | 420 | 120 | 140 | 80 |
| Example 3 | Control | Comp. A | $C_{20}$ Alcohol | Arachidyl Alcohol New Defoamer |
| Foam Vol., ml | 420 | 120 | 320 | 100 |
| Example 4 | Control | Comp. A | $C_8$ Alcohol | 2-Ethyl Hexyl Alcohol New Defoamer |
| Foam Vol., ml | 420 | 120 | 320 | 100 |

EXAMPLE 5

Example 5 was carried out under reaction conditions similar to Example 1 except the defoamer mixture contained 59 weight percent tall oil, 20 weight percent gas oil (mixed $C_{12-18}$ fatty acids which are predominantly unsaturated), 20 weight percent monoethanolamide of soya fatty acids and 1 percent decyl alcohol ($C_{10}$ alcohol).

The formulation of Example 5 was tested for its defoaming properties according to the procedure discussed in Example 1 and after 5 seconds the total volume of foam produced was calculated to be 60 mls.

EXAMPLES 6-8 and COMPARATIVE B

Examples 6-8 and Comparative Example B demonstrate the effect of varying amounts of the alcohol component in the defoaming composition. Examples 6-8 and Comparative Example B were prepared according to the procedures outlined in Example 1 except that varying amounts (0 to 5%) of decyl alcohol were utilized. The results obtained with Examples 6-8 and Comparative Example B are summarized in the following table:

| Example | % $C_{10}$ Alcohol | Foam Volume (mls) Produced in 5 Seconds |
|---|---|---|
| 6 | 5 | 70 |
| 7 | 2 | 110 |
| 8 | 1 | 110 |
| Comparative B | 0 | 140 |

All of the above results were determined by the test described in Example 1 after five seconds. The initial knock-down of the foam after the five seconds for the defoamer of the invention is shown to be very fast and very effective. The difference between 120 and 80 and even 120 and 100 is quite significant for wet phosphoric acid processes and lends great practical advantages to such processes.

As is noted from the above examples and comparisons, the defoamer composition and method of the present invention provide an improvement in defoaming operations during the wet process production of phosphoric acid. The addition of alcohol to the monocarboxylic acid and monoalkanolamide mixture has a synergistic effect which provides unexpectedly good results in terms of increasing the defoaming ability of the defoamer composition mixture containing the alcohol.

The scope of the present invention is not limited by the description, examples, and suggested uses herein, and modifications can be made without departing from the spirit of the invention. For example, a secondary alcohol such as methylamyl alcohol may be utilized as the alcohol additive to the defoamer composition to provide an improved defoamer composition for use in wet process phosphoric acid production. Thus, it is intended that the present invention covers the modifications and variations of this invention provided they come within the scope of the appended claims and their equivalents.

What is claimed is:

1. A defoamer composition comprising a mixture of defoaming effective amounts of:
   (a) a monocarboxylic acid having from 12 to 26 carbon atoms and melting points below about 20° C.;
   (b) a monoalkanolamide, wherein said monoalkanolamide is derived from a monocarboxylic acid having from 12 to 26 carbon atoms and melting point below about 20° C. and a monoalkanolamine; and
   (c) an alcohol selected from the group consisting of primary linear aliphatic alcohols ranging from $C_4$ to $C_{20}$, primary branched aliphatic alcohols ranging from $C_4$ to $C_{20}$, and secondary alcohols ranging from $C_6$ to $C_{12}$, wherein the proportion in weight percent of the components (a), (b) and (c) are:
   50 to 95 weight percent of (a);
   5 to 45 weight percent of (b); and
   0.25 to 20 weight percent of (c).

2. The defoamer composition of claim 1 wherein the proportion in weight percent of the components (a), (b) and (c) is:
   65 to 85 weight percent of (a);
   15 to 23 weight percent of (b); and
   0.5 to 10 weight percent of (c).

3. The defoamer composition of claim 1 wherein the monoalkanolamine is selected from the group consisting of monoethanolamine, iso-propanolamine, n-propanolamine and N-(aminoethyl)ethanolamine.

4. The defoamer composition of claim 1 wherein the monoalkanolamine is monoethanolamine.

5. The defoamer composition of claim 1 wherein the monocarboxylic acid is selected from the group consisting of myristoleic acid, palmitoleic acid, oleic acid, linoleic acid, linolenic acid, ricinoleic acid, tall oil, tall oil fatty acid, rosin acid and mixtures thereof.

6. The defoamer composition of claim 1 wherein the weight percent of alcohol compound (c) is about 1%.

7. The defoamer composition of claim 1 wherein the alcohol compound (c) is selected from the group consisting of hexyl, tetradecyl, arachidyl, 2-ethyl hexyl and decyl alcohol.

8. A method of inhibiting foaming in a phosphate rock and sulfuric acid medium employed in the synthesis of phosphoric acid which comprises adding to the reaction medium an effective amount of a defoamer composition comprising a mixture of:
   (a) 50 to 95 weight percent of a monocarboxylic acid from 12 to 26 carbon atoms and a melting point below about 20° C.;
   (b) 5 to 45 weight percent of a monoalkanolamide, wherein said monoalkanolamide is derived from a monocarboxylic acid having from 12 to 26 carbon atoms and a melting point below about 20° C. and a monoalkanolamine; and
   (c) 0.25 to 20 weight percent of an alcohol selected from the group consisting of primary linear aliphatic alcohols ranging from $C_4$ to $C_{20}$, primary branched aliphatic alcohols ranging from $C_4$ to $C_{20}$, and secondary alcohols ranging from $C_6$ to $C_{12}$.

9. The method of claim 8 wherein the proportion in weight percent of the components (a), (b) and (c) of the defoamer composition is:
   65 to 85 weight percent of (a);
   15 to 23 weight percent of (b); and
   0.5 to 10 weight percent of (c).

10. The method of claim 8 wherein the monoalkanolamine is selected from the group consisting of monoethanolamine, iso-propanolamine, n-propanolamine and N-(aminoethyl)ethanolamine.

11. The method of claim 8 wherein the monoalkanolamine is monoethanolamine.

12. The method of claim 8 wherein the monocarboxylic acid is selected from the group consisting of myristoleic acid, palmitoleic acid, oleic acid, linoleic acid, linolenic acid, ricinoleic acid, tall oil, tall oil fatty acid, rosin acid and mixtures thereof.

13. The method of claim 8 wherein the effective amount of the defoamer composition is from about 1 to about 5 pounds of the defoamer composition per ton of $P_2O_5$ in the phosphate rock.

* * * * *